Jan. 5, 1926.  1,568,367
G. R. DERR
STEERING POST FOR AUTOMOBILES
Filed April 4, 1925
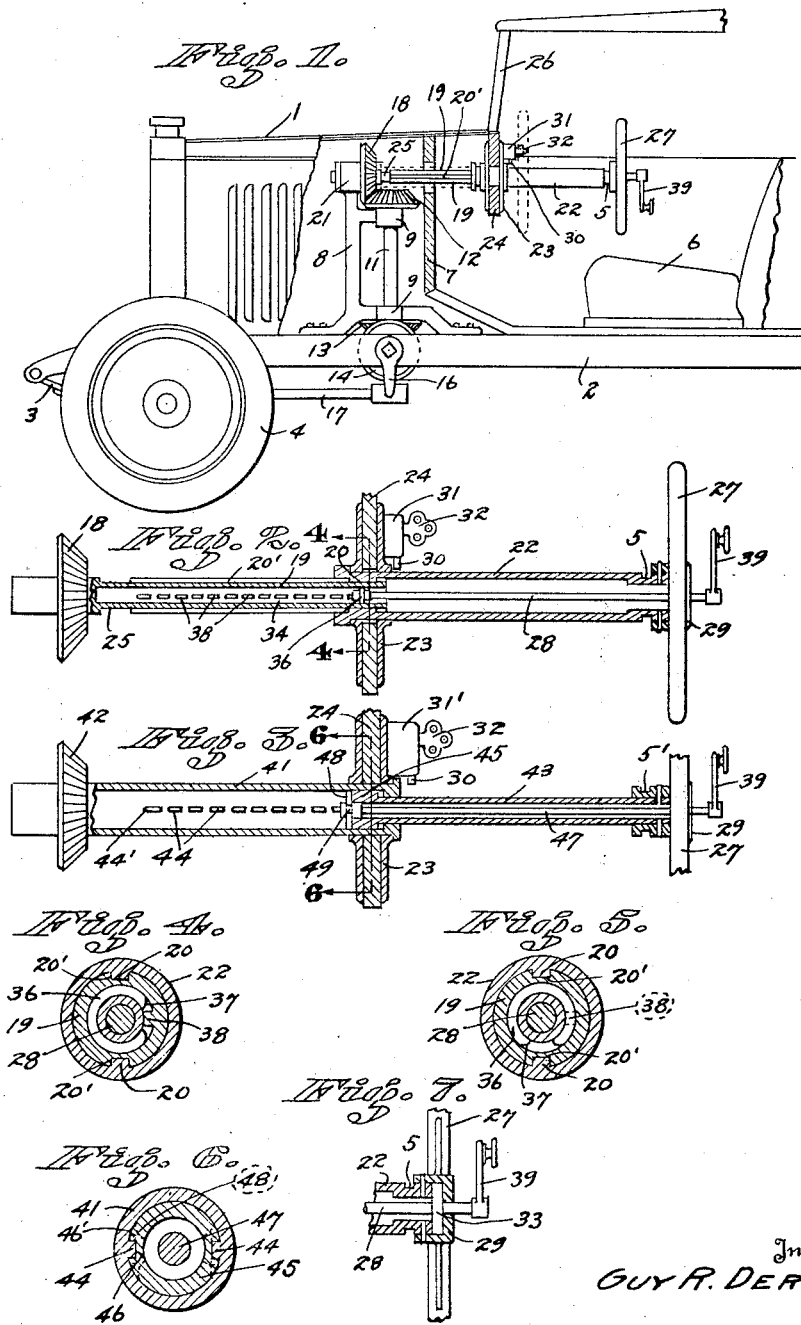

Patented Jan. 5, 1926.

1,568,367

UNITED STATES PATENT OFFICE.

GUY R. DERR, OF SANTA MARGARITA, CALIFORNIA.

STEERING POST FOR AUTOMOBILES.

Application filed April 4, 1925. Serial No. 20,809.

*To all whom it may concern:*

Be it known that I, GUY R. DERR, a citizen of the United States, and a resident of Santa Margarita, county of San Luis Obispo and State of California, have invented a new and useful Improvement in Steering Posts for Automobiles, of which the following is a specification.

The present invention relates to improvements in steering posts for automobiles, and its particular object is to provide a steering post that will be more convenient to handle than the steering post ordinarily used in the present motor vehicle and will provide a better means of locking same against use. It is particularly proposed for this purpose to provide a steering post arranged horizontally with the steering wheel at the end thereof disposed in a vertical plane, and allowing the driver to manipulate the wheel while his elbows rest against his body, the vertical position of the wheel allowing the latter to be handled by merely pushing upward on one side and pulling straight downward on the other side.

One of the advantages of this arrangement is that it allows the driver to hold his arms in the position which comes most natural to most people and a further advantage is that the steering wheel which usually, particularly in large cars, obstructs a portion of the field of vision, can be disposed in such a manner as to be clearly below the latter field.

It is further proposed to arrange the steering post in such a manner that it is extensible and allows the driver to push the steering wheel forward toward the dashboard of the motor vehicle when he wishes to leave the machine or to enter the same, while, when seated, he may draw the wheel toward his seat into a position where it is most convenient to handle, also that when the wheel is pushed forward as far as it will go it becomes operatively disengaged so that the vehicle cannot be steered with it, and it may be then locked against pulling out into engagement.

Further objects and advantages of my device will appear as the specification proceeds.

The preferred form of my invention is illustrated in the accompanying drawing, in which—

Figure 1 shows an assembly arrangement of my steering mechanism arranged in a motor vehicle.

Figure 2 a longitudinal section through the steering post.

Figure 3 a longitudinal section through a steering post of modified form.

Figure 4 a transverse section taken along line 4—4 of Figure 2.

Figure 5 a section taken along the same line with the locking element turned into locking position.

Figure 6 a transverse section taken along line 6—6 of Figure 3, and

Figure 7 a central section through the steering wheel.

While I have shown only the preferred form of the invention, it should be understood that various changes or modifications may be made within the scope of the claims hereto attached without departing from the spirit of the invention.

Of the automobile 1 only the front part is shown including a portion of the frame 2 resting on the springs 3 which latter are supported by wheels 4. A seat 6 is arranged a convenient distance behind the dashboard 7 and a suitable bracket 8 is supported on the frame in front of the latter board. The bracket 8 supports two vertically alined bearings 9 in which is revolvably mounted a vertical shaft 11 terminating at the top in a bevel gear 12 and at the bottom in a bevel gear 13. The latter meshes with the bevel gear 14 mounted coaxially with the steering arm 16 which latter manipulates the tie bar 17 connected with the steering knuckle of the motor vehicle of conventional construction and, therefore, not shown in the drawing. The upper bevel gear 12 meshes with a bevel gear 18 on the shaft 19 supported in a bearing 21 forming part of the bracket 8 and in a sleeve 22 slidable in a bearing 23 associated with the board 24 projecting downwardly from the windshield 26.

The shaft 19 is disposed in a horizontal position and extends lengthwise of the body of the vehicle. The tube 22 which is slidable on the shaft 19 and is held against rotary motion by short keys 20 at its inner end riding in registering grooves 20' of the shaft and has a steering wheel 27 secured to the rear end thereof and may be slid backward and forward on the shaft 19 between the full line position and the dotted line position shown in Figure 1 so that in one position it is convenient to handle for the driver seated on the seat 6 while in the dotted line position it does not interfere with the driver entering the car or leaving the same.

When the steering wheel is pushed forward to the limit of its motion the short keys pass out of the grooves 20' and are free in an annular recess 25 in the shaft 19 so as to disengage the telescopic portions of the steering post and permit the steering wheel to revolve loosely without steering the vehicle.

Also when the wheel is pushed forward as described an annular groove 5 formed on the steering post adjacent the wheel is brought in alinement with a bolt 30 of a lock 31 positioned on the bearing and the bolt may be locked into the groove 5 by means of the key 32 thus holding the wheel against the dash free to revolve and proof against pulling back into operative engagement.

Means are also provided in combination with the extensible steering post for locking the tube 22 in any degree of extension desired. For this purpose I provide a rod 28 supported in the hub 29 of the steering wheel and held against endwise motion relative to the wheel by the collar 33 confined between the end of the tube and the hub of the steering wheel. The front end of the rod extends into a bore 34 of the shaft 19 and carries a disk 36 coextensive in diameter with the bore. The disk 36 is recessed as shown at 37 in Figure 4 and when this recess is alined with a row of projections 38 in the shaft, it allows the rod 28 and with it the tube 22 to slide freely relative to the shaft 19. When the rod 28 is turned, however, by means of a handle 39, the disk is made to enter one of the spaces between the projections 38 and interlocks with the two adjacent projections so as to prevent endwise motion of the rod and the tube 22.

It should be understood that there are other equivalent ways of rendering the steering post extensible and a second form is illustrated in Figures 3 and 6. In the latter case the tube 41 is revolvably supported but fixed against longitudinal movement and has a bevel gear 42 meshing with the bevel gear 12 secured thereto, while a hollow shaft 43 is slidable in the tube 41. To hold the hollow shaft against revolving motion relative to the tube 41, lines of projections 44 extending inwardly from the tube are made to ride in registering grooves 46 in the outer faces of a collar 45 on the hollow shaft 43. A rod 47 secured to the steering wheel in the manner previously described relative to the rod 28 has a disk 48 at its front end made coextensive with the dimensions of the collar on the hollow shaft and provided with a notch 49 which latter is made to register with one of the grooves 46 and in that case allows of endwise motion of the hollow shaft but which may also be turned so that the disk interlocks with two adjacent projections 44 of the tube 41.

This arrangement of telescopic steering post also frees the wheel section from rotative engagement with the gear section by the grooved collar 45 of the tube 43 being pushed beyond the last of the projections 44 where it is free to revolve. The grooves in the collar are beveled at 46' so as to cooperate with the beveled end 44' of the last projection for easy entrance for reengagement.

This form also locks with wheel in position against the dash by the groove 5' adjacent the steering wheel being brought under the lock 31' as for the other form described.

The manner of using the adjustable feature of my steering post will be readily understood from the foregoing description. Normally the sleeve 22 of Figure 1 is pushed into the most forward position indicated in dotted lines and then interferes very little with the driver entering the car or leaving the same. After the driver has taken his seat, he pulls the steering wheel backward to any place that is most convenient for manipulating the same, and he thereupon turns the handle 39 whereby he locks the steering wheel in that particular position. Any rotary motion of the steering wheel is imparted through the bevel gears 18 and 12 and the bevel gears 13 and 14 to the steering arm 16 and the tie bar 17 which latter actuates the steering knuckle. This arrangement allows the driver to hold his arms in the most comfortable position, it places the steering wheel so as not to interfere with the field of vision and it allows the same to be manipulated by a straight downward pull on one side of the steering wheel and a straight upward push on the other side.

I claim:

1. Means for operating a steering knuckle tie bar of a motor vehicle comprising an extensible steering post with a steering wheel secured thereto and operative connections from the steering post to the knuckle, and means for locking said post in minimum extension with the wheel free for non-operative rotation.

2. Means for operating a steering knuckle tie bar of a motor vehicle comprising a telescopic steering post operatively connected to the steering knuckle and with a steering wheel on the end of one telescopic section, means for engaging the sections for common rotation and means for locking the wheel carrying section in disengagement.

3. Means for operating a steering knuckle tie bar of a motor vehicle comprising a horizontally and longitudinally disposed steering post consisting of two sections in telescoping engagement, an operative connection between one of the sections and the tie bar, a steering wheel at the free end of the other section, means for interlocking the two sections against telescoping motion at desired points, means for engaging the sections for common rotation made to become inactive when full telescoping engagement is effected and means for locking the steering wheel section against endwise motion in the latter position.

GUY R. DERR.